(12) United States Patent  
Ishii

(10) Patent No.: US 8,838,730 B2  
(45) Date of Patent: Sep. 16, 2014

(54) APPARATUS FOR DISPLAYING AN IMAGE, SYSTEM PROCESSING IMAGE DATA, AND METHOD OF PROCESSING IMAGE DATA

(75) Inventor: Eisaku Ishii, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 973 days.

(21) Appl. No.: 12/448,133

(22) PCT Filed: Dec. 13, 2007

(86) PCT No.: PCT/JP2007/074470
§ 371 (c)(1),
(2), (4) Date: Jun. 10, 2009

(87) PCT Pub. No.: WO2008/075733
PCT Pub. Date: Jun. 26, 2008

(65) Prior Publication Data
US 2010/0115052 A1 May 6, 2010

(30) Foreign Application Priority Data
Dec. 19, 2006 (JP) ................................. 2006-341280

(51) Int. Cl.
*G06F 15/16* (2006.01)
*G06F 15/00* (2006.01)
*G06F 3/038* (2013.01)
*G06F 3/00* (2006.01)
*G09B 5/00* (2006.01)

(52) U.S. Cl.
CPC ........................................ *G09B 5/00* (2013.01)
USPC ........... 709/217; 709/203; 709/204; 709/227; 345/501; 345/204; 715/741

(58) Field of Classification Search
USPC .......... 709/217, 203, 204, 227; 345/501, 204; 715/741
See application file for complete search history.

(56) References Cited

U.S. PATENT DOCUMENTS

| | | | |
|---|---|---|---|
| 7,682,028 B2 * | 3/2010 | Maeda et al. | 353/30 |
| 2004/0075746 A1 * | 4/2004 | Takamine et al. | 348/207.1 |
| 2005/0036509 A1 * | 2/2005 | Acharya et al. | 370/466 |
| 2007/0085846 A1 * | 4/2007 | Yang et al. | 345/204 |

FOREIGN PATENT DOCUMENTS

| | | |
|---|---|---|
| JP | 9-83708 | 3/1997 |
| JP | 2000-197164 A | 7/2000 |
| JP | 2002-149517 A | 5/2002 |
| JP | 2004-199454 A | 7/2004 |
| JP | 2004-258909 | 9/2004 |
| JP | 2004-274295 A | 9/2004 |

(Continued)

*Primary Examiner* — Viet Vu
*Assistant Examiner* — Herman Belcher
(74) *Attorney, Agent, or Firm* — McGinn IP Law Group, PLLC

(57) ABSTRACT

An apparatus of the present invention for displaying an image comprises connected device controller 22 for notifying one of a plurality of apparatuses S1 to Sn for transmitting an image connected via a network 99 and that has made a first connection request after activation, of information that display authority that is a right to preferentially perform processing for displaying an image is granted and of information that image data may be transmitted at any time, and for notifying another one or more of the plurality of apparatuses for transmitting an image and that have made a connection request, of information that image data cannot be transmitted unless permitted.

18 Claims, 7 Drawing Sheets

(56) References Cited

FOREIGN PATENT DOCUMENTS

| JP | 3595417 | 9/2004 |
| JP | 2004-328631 | 11/2004 |
| JP | 2005-86689 A | 3/2005 |
| JP | 2005-184536 | 7/2005 |
| JP | 2005-292500 A | 10/2005 |
| JP | 2006-92365 A | 4/2006 |

* cited by examiner

APPARATUS FOR DISPLAYING AN IMAGE, SYSTEM PROCESSING IMAGE DATA, AND METHOD OF PROCESSING IMAGE DATA

This application is based upon and claims the benefit of priority from Japanese Patent Application No. 2006-341280 filed on Dec. 19, 2006, the content of which is incorporated by reference.

TECHNICAL FIELD

The present invention relates to an apparatus for displaying an image, such as a projector and a display, a system for processing image data, and a method of processing image data.

BACKGROUND ART

Japanese Patent Laid-Open No. 2004-328631 discloses a technique that a number of apparatuses for processing information which generate images are connected to an apparatus for processing an image which prints images through a network so that the apparatuses for processing information share the single apparatus for processing an image.

Like the technique of the above document, it is a common practice to connect an apparatus (hereinafter called "image display apparatus") for displaying an image with a number of apparatuses (hereinafter called "image transmitting apparatus") that transmit an image to the image display apparatus over a network and to display images transmitted from the image transmitting apparatuses on the single image display apparatus. For example, a number of persons may attend a meeting with their own information processing apparatuses, such as a notebook PC and a mobile terminal, may connect the information processing apparatuses to a single projector by way of a network, and may make the projector display materials stored in their information processing apparatuses.

DISCLOSURE OF THE INVENTION

Some image display apparatuses of the above described type, when they are connected to a single image transmitting apparatus, from among a number of image transmitting apparatuses that are connected via a network, will not permit connection to another image transmitting apparatus, because they can only accept image data from the single image transmitting apparatus. In such a case, while the image display apparatus is connected with one image transmitting apparatus, the image display apparatus cannot receive image data from another image transmitting apparatus even if it attempts to receive the image data.

When an image display apparatus can permit connection from a number of image transmitting apparatuses and can allow each of the apparatuses to freely transmit image data to it, it is possible for a plural number of image data to be simultaneously transmitted to the image display apparatus. In such a situation, a network band will be congested with the image data that are transmitted simultaneously.

In addition, as the Central Processing Unit (CPU) of the image display apparatus performs display processing in the order that the image data is received, it has to process a considerable amount of image data in a short amount of time, which increases the load on it. This leads to a problem of increasing the time between transmission of image data from an image transmitting apparatus and displaying an image on the image display apparatus.

It is an object of the present invention to provide an image display apparatus, an image data processing system, and an image data processing method that prevent congestion of a network band with image data transmitted from a number of image transmitting apparatuses and that enable displaying image data from any one of the image transmitting apparatuses.

An image display apparatus of the present invention comprises a connected device controller for notifying one of a plurality of image transmitting apparatuses connected via a network and that has made a first connection request after activation, of information that display authority that is a right to preferentially perform processing for displaying an image is granted and of information that image data may be transmitted at any time, and for notifying another one or more of the plurality of image transmitting apparatuses and that have made a connection request, of information that image data cannot be transmitted unless permitted.

A system of the present invention for processing image data, comprises a plurality of image transmitting apparatuses, and an image display apparatus including a connected device controller for notifying one of the plurality of image transmitting apparatuses connected via a network and that has made a first connection request after activation, of information that display authority that is a right to preferentially perform processing for displaying an image is granted and of information that image data may be transmitted at any time, and for notifying another one or more of the plurality of image transmitting apparatuses and that have made a connection request, of information that image data cannot be transmitted unless permitted.

A method of present invention for processing image data by an image display apparatus, comprises: notifying one of a plurality of image transmitting apparatuses connected via a network and that has made a first connection request after activation, of information that display authority that is a right to preferentially perform processing for displaying an image is granted and of information that image data may be transmitted at any time; and notifying another one or more of the plurality of image transmitting apparatuses and that have made a connection request, of information that image data cannot be transmitted unless permitted.

In the present invention, image data received from an image transmitting apparatus having the display authority can be always displayed, and an image transmitting apparatus that does not have the display authority cannot transmit image data to the image display apparatus unless the image transmitting apparatus is permitted to do so. In addition, the present invention can also permit an image transmitting apparatus having no display authority to transmit image data depending on the load condition of the image display apparatus.

According to the present invention, the display authority is granted to one of a number of image transmitting apparatuses, and image data received from that image transmitting apparatus is preferentially displayed. Other image transmitting apparatuses cannot transmit image data to the image display apparatus unless they are permitted to do so by the image display apparatus. This can prevent congestion of a network band with image data from image transmitting apparatuses that do not have the display authority.

BEST MODE FOR CARRYING OUT THE INVENTION

An image display apparatus according to the present exemplary embodiment is characterized in that it can grant the display authority, which is a right to preferentially perform image display processing, to any one of a number of image transmitting apparatuses which are connected via a network.

Figure 1:
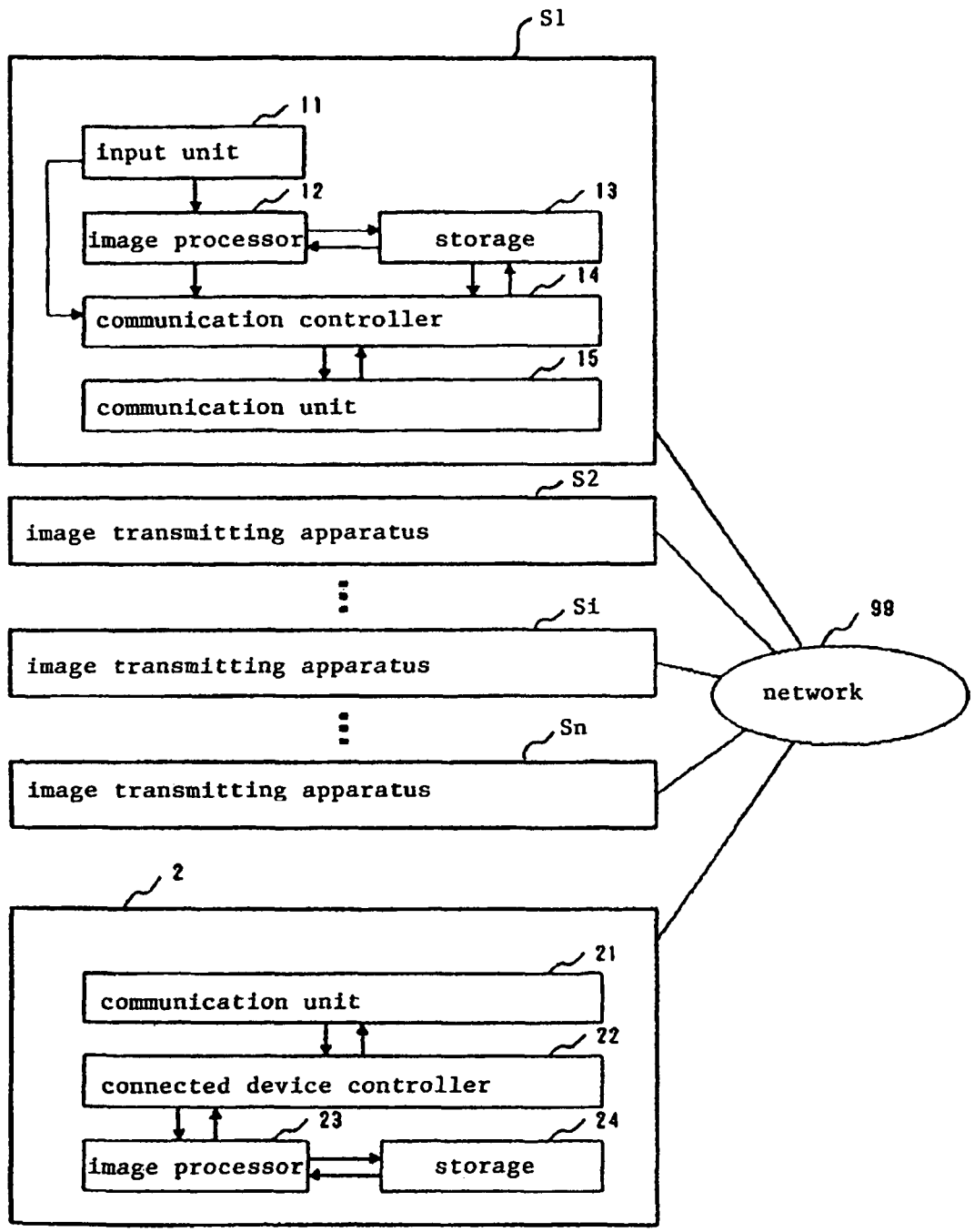
FIG. 1 is a block diagram showing an exemplary configuration of an image data processing system according to an exemplary embodiment.

An image data processing system of an exemplary embodiment will be described in detail with reference to drawings. FIG. 1 is a block diagram showing an exemplary configuration of the image data processing system according to the exemplary embodiment.

As shown in FIG. 1, in the image data processing system of the exemplary embodiment, image display apparatus 2 and a number of image transmitting apparatuses S1 to Sn (n being an integer greater than 1) are connected with each other via network 99.

Figure 2:
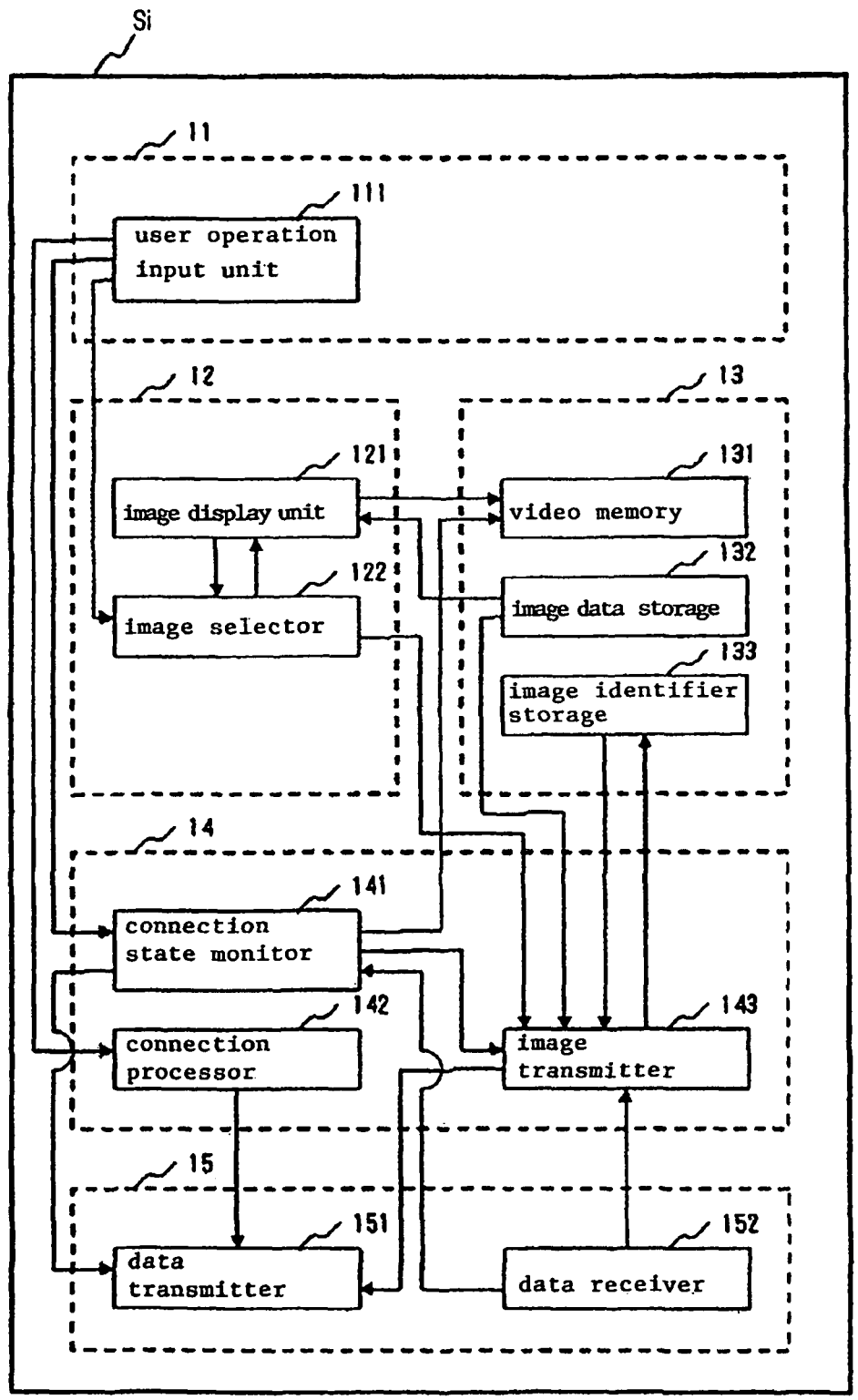
FIG. 2 is a block diagram showing an exemplary configuration of an image transmitting apparatus according to the exemplary embodiment.

FIG. 2 is a block diagram showing an exemplary configuration of the image transmitting apparatus according to the exemplary embodiment.

As shown in FIG. 2, image transmitting apparatuses S1 to Sn of the exemplary embodiment each include input unit 11, image processor 12, storage 13, communication controller 14, and communication unit 15. In each of image transmitting apparatuses S1 to Sn, a CPU (not shown) and a memory (not shown) are provided. A program is stored in the memory, and image processor 12 and communication controller 13 operate under control of the CPU which executes predetermined processing in accordance with the program. Image transmitting apparatuses S1 to Sn are apparatuses for processing information such as personal computers, Personal Digital Assistants (PDAs), and mobile telephones, for instance. In the following, each component of image transmitting apparatus Si (i being an arbitrary integer between 1 and n) will be described in detail.

Input unit 11 includes user operation input unit 111 for a user to input instructions. Image processor 12 includes image display unit 121 for displaying an image for the user, and image selector 122 for providing the user with means for selecting an image.

Storage 13 includes video memory 131 used for displaying an image, image data storage 132 for maintaining image data as a source of data for transmission, and image identifier storage 133 for storing transmitted image data and an image identifier assigned by image display apparatus 2 in association with each other. The image identifier is for identifying image data and is different for each image data.

Communication controller 14 includes connection state monitor 141, connection processor 142, and image transmitter 143. Connection state monitor 141 manages the connection state between image transmitting apparatus Si and image display apparatus 2. Connection processor 142 performs connection processing with image display apparatus 2 via network 99. Image transmitter 143 transmits image data in accordance with an image transmission condition assigned by image display apparatus 2. Communication unit 15 includes data transmitter 151 and data receiver 152.

When a request for connection to image display apparatus 2 is input by user operation input unit 111, connection processor 142 transmits a connection request signal, which is a signal requesting a connection, to image display apparatus 2.

When connection processor 142 receives from image display apparatus 2 information that the display authority is granted and that image data may be transmitted at any time, image transmitter 143 checks whether or not information on an image identifier is stored in image identifier storage 133. If an image identifier is stored, image transmitter 143 transmits the image identifier to image display apparatus 2. On the other hand, if information on an image identifier is not stored in image identifier storage 133, image transmitter 143 transmits image data for display to image display apparatus 2.

When connection processor 142 receives information that image data cannot not be transmitted without permission after sending a connection request signal to image display apparatus 2, image transmitter 143 waits until reception of a transmission enabling signal, which is a signal indicating that transmission of image data is permitted. Then, when connection processor 142 receives a transmission enabling signal from image display apparatus 2, image transmitter 143 transmits image data for display to image display apparatus 2.

Figure 3:
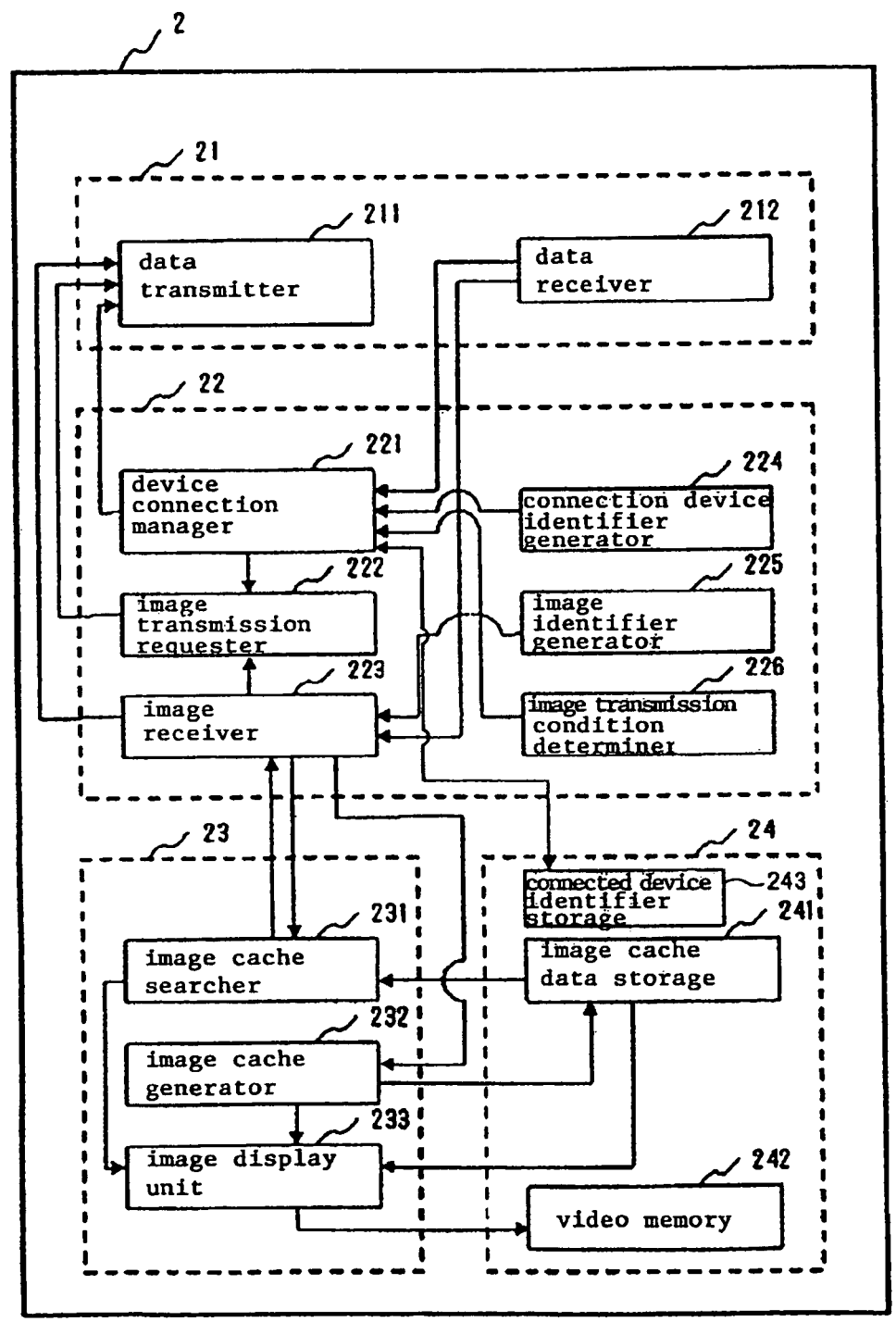
FIG. 3 is a block diagram showing an exemplary configuration of an image display apparatus according to the exemplary embodiment.

FIG. 3 is a block diagram showing an exemplary configuration of the image display apparatus according to the exemplary embodiment.

Referring to FIG. 3, image display apparatus 2 of the present invention includes communication unit 21, connected device controller 22, image processor 23, and storage 24. In image display apparatus 2, a CPU (not shown) and a memory (not shown) are provided. A program is stored in the memory, and connected device controller 22 and image processor 23 operate under control of the CPU which executes predetermined processing in accordance with the program. Communication unit 21 corresponds to communication means, connected device controller 22 to connected device control means, image processor 23 to image processing means, and storage 24 to storage means. Image display apparatus 2 is a display device such as a projector and a display, for instance.

As the optical mechanism of the display device such as a projector is similar to that of a related projector, a figure for showing its configuration and the description thereof are omitted.

Storage 24 includes connected device identifier storage 243 that stores a connected device identifier for identifying an image transmitting apparatus that has the display authority, image cache data storage 241 that stores image data and image identifiers, and video memory 242 for image display. Communication unit 21 includes data transmitter 211 and data receiver 212.

Connected device controller 22 includes device connection manager 221, image transmission requester 222, image receiver 223, connected device identifier generator 224, image identifier generator 225, and image transmission condition determiner 226.

Device connection manager 221 manages the connection state of image transmitting apparatus Si. Image transmission requester 222 gives a trigger for image data transmission to image transmitting apparatus Si. Image receiver 223 receives image data or an image identifier from image transmitting apparatus Si. Connected device identifier generator 224 generates a connected device identifier for identifying each of image transmitting apparatuses Si. Image identifier generator 225 generates an image identifier that can uniquely identify a received image. Image transmission condition determiner 226 determines a condition of image transmission for image transmitting apparatus Si from which a connection request has been received.

When device connection manager 221 receives a connection request signal from the first image transmitting apparatus after activation, device connection manager 221 grants the display authority to that image transmitting apparatus and also transmits information that image data may be transmitted at any time. To other image transmitting apparatuses which have transmitted a connection request signal after that, device connection manager 221 transmits information that image data cannot be transmitted until they are permitted.

When device connection manager 221 notifies an image transmitting apparatus that the display authority is granted to that image transmitting apparatus, device connection manager 221 stores the connected device identifier of that image transmitting apparatus in connected device identifier storage 243. Then, when the image transmitting apparatus that has the display authority changes, device connection manager 221 deletes the connected device identifier stored before the change from connected device identifier storage 243, and stores a new connected device identifier after the change in connected device identifier storage 243.

If image data is not received from the image transmitting apparatus with the display authority for a predetermined time period or longer, connected device manager 221 transmits a transmission enabling signal to one of the image transmitting apparatuses which do not have the display authority. Here, if a number of image transmitting apparatuses have made a connection request, device connection manager 221 may also store their respective connected device identifiers with information indicating the order in which their connection requests were received in connected device identifier storage 243 in advance and may transmit transmission enabling signals in that order.

When connected device manager 221 receives image data from any one of the image transmitting apparatuses, connected device manager 221 determines whether the connected device identifier of the image transmitting apparatus that has sent the image data is stored or not in connected device identifier storage 243, and notifies image processor 23 of the result. Since the method for identifying an originating image transmitting apparatus is similar to a method for identifying the other party when data is transmitted/received via a network based on Transmission Control Protocol/Internet Protocol (TCP/IP), detailed description of the method is omitted. When transmitted/received data is packet data, the other party can be identified from information in a header.

When device connection manager 221 grants the display authority to an image transmitting apparatus, image transmission condition determiner 226 may permit different image transmission conditions to the image transmitting apparatus which is granted the display authority and to the other image transmitting apparatuses which are not granted the display authority. Image transmission condition determiner 226 permits an image transmission condition having high priority to the image transmitting apparatus with the display authority, and grants image transmission conditions having low priority to the other image transmitting apparatuses that do not have the display authority.

An image transmission condition having high priority may be a data transmission unit larger than a predetermined unit, a data transmission frame size larger than a predetermined frame size, a time-out period shorter than a predetermined time period, retransmission upon a transmission failure, and so on.

An image transmission condition having low priority may be a data transmission unit smaller than a predetermined unit, a data transmission frame size smaller than a predetermined frame size, a time-out period longer than a predetermined time period, no re-transmission upon a transmission failure, and the like.

The purpose of permitting an image transmission condition having lower priority to an image transmitting apparatuses with no display authority rather than to an image transmitting apparatus with the display authority as described above is to prevent image data from the image transmitting apparatuses with no display authority from hindering transmission of image data from the image transmitting apparatus with display authority in the network.

Image processor 23 includes image cache searcher 231, image cache generator 232, and image display unit 233.

Image cache searcher 231 checks whether image data corresponding to an image identifier transmitted from image transmitting apparatus Si is present in image cache data storage 241. Image cache generator 232 stores image data received from image transmitting apparatus Si and an image identifier as a pair in image cache data storage 241. Image display unit 233 displays image data received from image transmitting apparatus Si or image data cached in image cache data storage 241.

Image processor 23 receives the result of determining whether the connected device identifier of the image transmitting apparatus which is the sender of externally received image data is stored or not in connected device identifier storage 243 from connected device controller 22. If the connected device identifier is not stored in connected device identifier storage 243, image cache generator 232 stores the image data and an image identifier as a pair in image cache data storage 241. On the other hand, if the connected device identifier is stored in connected device identifier storage 243, image display unit 233 displays the image data.

Next, the operation of the image data processing system according to the exemplary embodiment will be described with reference to FIGS. 2 and 3, and with reference to flowcharts.

It is assumed here that image transmitting apparatus S1 obtains the display authority for image display apparatus 2 and obtains an image transmission condition which the priority is higher than other image transmitting apparatus Si (i being any integer between 2 and n). In addition, image display apparatus 2 executes in parallel processing of a connection from an image transmitting apparatus shown in steps B1 to B6 of a flowchart and image data reception processing from an image transmitting apparatus shown in steps D1 to Dx, and the order of execution is not limited to the one described below.

Figure 4:
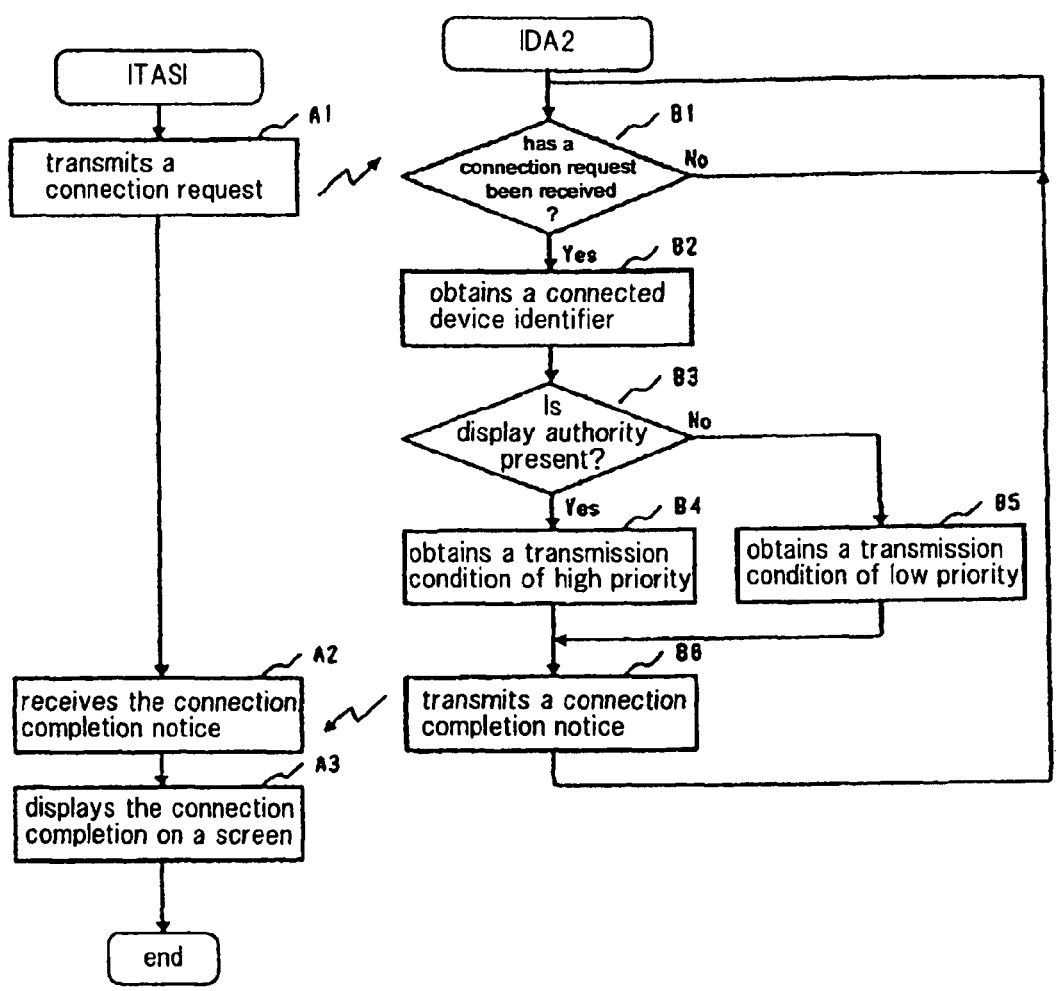
FIG. 4 is a flowchart illustrating the operational procedure for the image transmitting apparatus to connect to the image display apparatus.

First, the operation of image transmitting apparatus S1 connecting to image display apparatus 2 will be described. FIG. 4 is a flowchart illustrating the operational procedure for an image transmitting apparatus to connect to an image display apparatus. Hereinafter "IDA" is written as image display apparatus and "ITA" is written as image transmitting apparatus in flowcharts.

Upon accepting a connection request for image display apparatus 2 from user operation input unit 111, connection processor 142 of image transmitting apparatus S1 transmits a connection request signal to image display apparatus 2 via data transmitter 151 (step A1).

When connected device manager 221 of image display apparatus 2 determines that the first connection request signal after activation has been received from image transmitting apparatus S1 via data receiver 212 (step B1), connected device manager 221 obtains a connected device identifier that uniquely identifies image transmitting apparatus S1 from connected device identifier generator 224 (step B2).

Then, since other image transmitting apparatus Si is not connected to image display apparatus 2 yet and since image transmitting apparatus S1 is the first image transmitting apparatus that is connected, connected device manager 221 determines that image transmitting apparatus S1 is a connection that has the display authority for image display apparatus 2 (step B3). Then, connected device manager 221 stores the connected device identifier in connected device identifier storage 243.

Subsequently, connected device manager 221 obtains an image transmission condition having high priority which has the authority for image display from image transmission condition determiner 226 (step B4), and transmits to image transmitting apparatus S1 via data transmitter 211 a connection completion notice that includes information that the display authority is granted and that image data may be transmitted at any time as well as information that an image transmission condition having high priority is permitted (step B6).

Upon receipt of the connection completion notice and the image transmission condition having high priority from image display apparatus 2 via data receiver 152 (step A2), connection state monitor 141 of image transmitting apparatus S1 writes into video memory 131 that image transmitting apparatus S1 has gained the authority for image display on image display apparatus 2 to display the matter on a screen (step A3).

On the other hand, upon accepting a connection request for image display apparatus 2 from user operation input unit 111, connection processor 142 of the second or subsequent image transmitting apparatus Si transmits a connection request signal to image display apparatus 2 via data transmitter 151 (step A1).

When connected device manager 221 of image display apparatus 2 determines that a connection request signal from the second apparatus has been received from image transmitting apparatus Si via data receiver 221 (step B1), connected device manager 221 obtains a connected device identifier that uniquely identifies image transmitting apparatus Si from connected device identifier generator 224 (step B2).

Furthermore, connected device manager 221 determines that image transmitting apparatus Si is a connection that does not have the display authority for image display apparatus 2 because image transmitting apparatus S1 having the display authority is already connected to image display apparatus 2 (step B3). Then, connected device manager 221 obtains an image transmission condition having low priority from image transmission condition determiner 226 (step B5), and transmits to image transmitting apparatus Si via data transmitter 211 a connection completion notice including information that image data cannot be transmitted without permission, as well as information that an image transmission condition having low priority is permitted (step B6).

Upon receipt of the connection completion notice and the image transmission condition having low priority from image display apparatus 2 via data receiver 152 (step A2), connection state monitor 141 of image transmitting apparatus Si writes into video memory 131 that the authority for image display on image display apparatus 2 could not be acquired to display the matter on the screen (step A3).

Next, as concerns image transmitting apparatus S1 having display authority, the operation of transmitting image data to image display apparatus 2 will be described.

Figure 5:
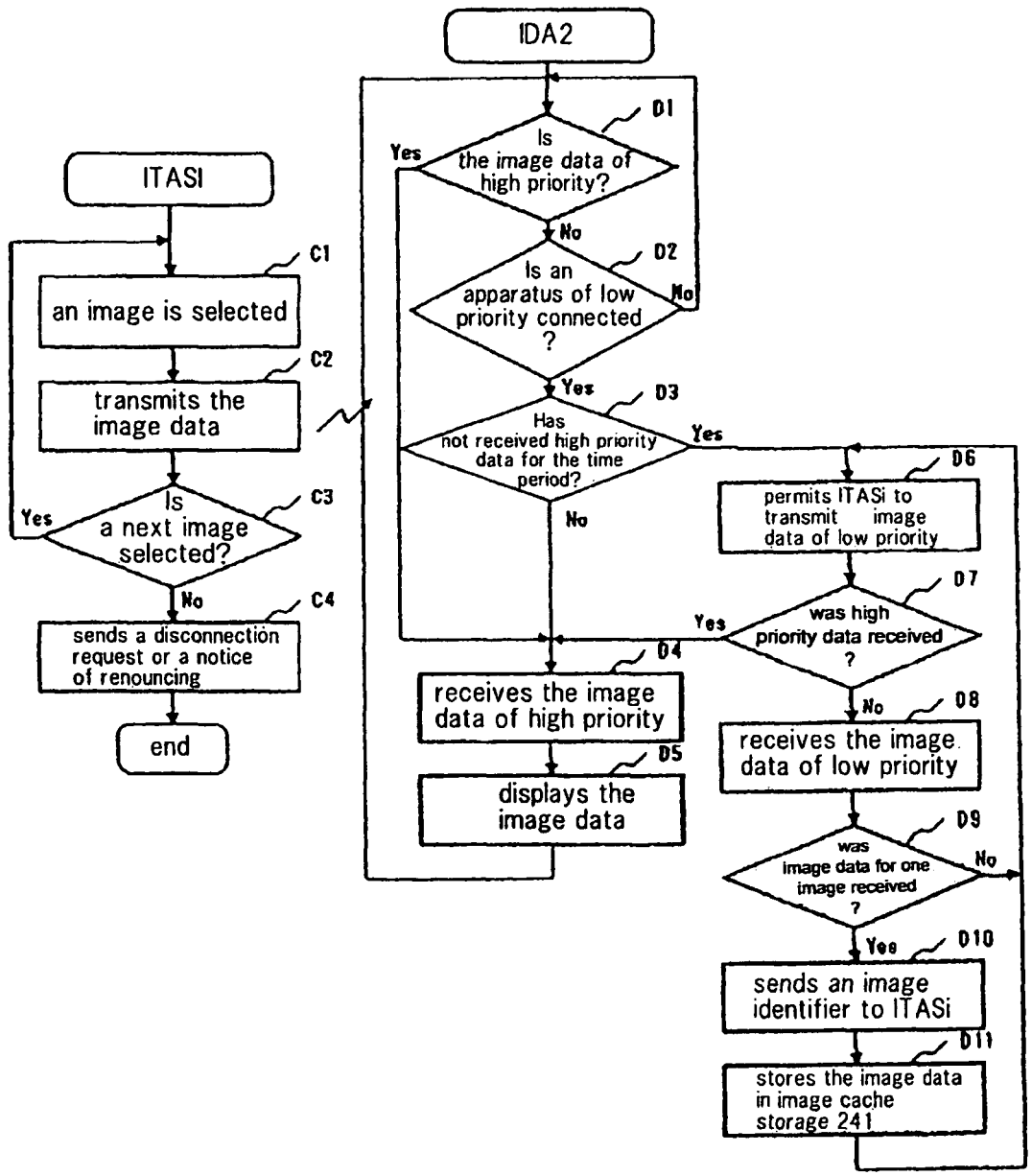
FIG. 5 is a flowchart illustrating the operational procedure for an image transmitting apparatus having the display authority to transmit image data to the image display apparatus.

FIG. 5 is a flowchart illustrating the operational procedure for an image transmitting apparatus having the display authority to transmit image data to an image display apparatus.

Image display unit 121 displays images stored in image data storage 132, and image selector 122 has the user select an image for display on image display apparatus 2 via user operation input unit 111. Image selector 122 notifies image transmitter 143 of the image selected by the user (step C1). Image transmitter 143 retrieves image data corresponding to the selected image from image data storage 132, and transmits the image data to image display apparatus 2 via data transmitter 151 in accordance with an image transmission condition for performing image data transmission and that has the display authority for image display apparatus 2 (step C2).

When image receiver 223 of image display apparatus 2 determines that image data of high priority has been received from image transmitting apparatus S1 which has the display authority (step D1), image receiver 223 receives the image data having high priority from image transmitting apparatus S1 which has the display authority via data receiver 212 (step D4). Image display unit 233 writes the image data into video memory 242 so as to display it on the screen (step D5). Detailed operations of transmitting/receiving image data and image caching will be described later with FIG. 7.

If the user is prompted to select the next image for display on image display apparatus 2 via user operation input unit 111, image selector 122 of image transmitting apparatus S1 returns to step C1 to continue image selection (step C3). On the other hand, when displaying images on image display apparatus 2 is to be terminated, connection processor 142 sends a line disconnection request signal for requesting disconnection of a network line to image display apparatus 2 via data transmitter 151 (step C4). Here, instead of a signal for requesting network line disconnection, it may send a signal for notifying that the display authority for image display apparatus 2 will be renounced (i.e., requesting that displaying images be finished) while leaving the network line connected.

Upon receipt of the signal requesting network line disconnection from image transmitting apparatus S1 via data receiver 212, device connection manager 221 of image display apparatus 2 disconnects the line, and transmits a line disconnection completion signal indicating that the network line has been disconnected to image transmitting apparatus S1 via data transmitter 211.

Alternatively, upon receipt of a notice that the display authority for image display apparatus 2 will be renounced from image transmitting apparatus S1 via data receiver 212, device connection manager 221 of image display apparatus 2 obtains an image transmission condition having low priority which does not have the authority for image display from image transmission condition determiner 226. Then, device connection manager 221 transmits to image display apparatus Si via data transmitter 211 information that image data cannot be transmitted unless permitted and that an image transmission condition having low priority is permitted. Furthermore, device connection manager 221 deletes the connected device identifier of image transmitting apparatus S1 from connected device identifier storage 243.

Next, description will be given of the operation of image transmitting apparatus Si that does not have the display authority to transmit image data little by little to image display apparatus 2 in advance while image data from image transmitting apparatus S1 is not being transmitted. It is assumed here that image transmitting apparatus S1 is the apparatus that preferentially transmits image data.

Figure 6:
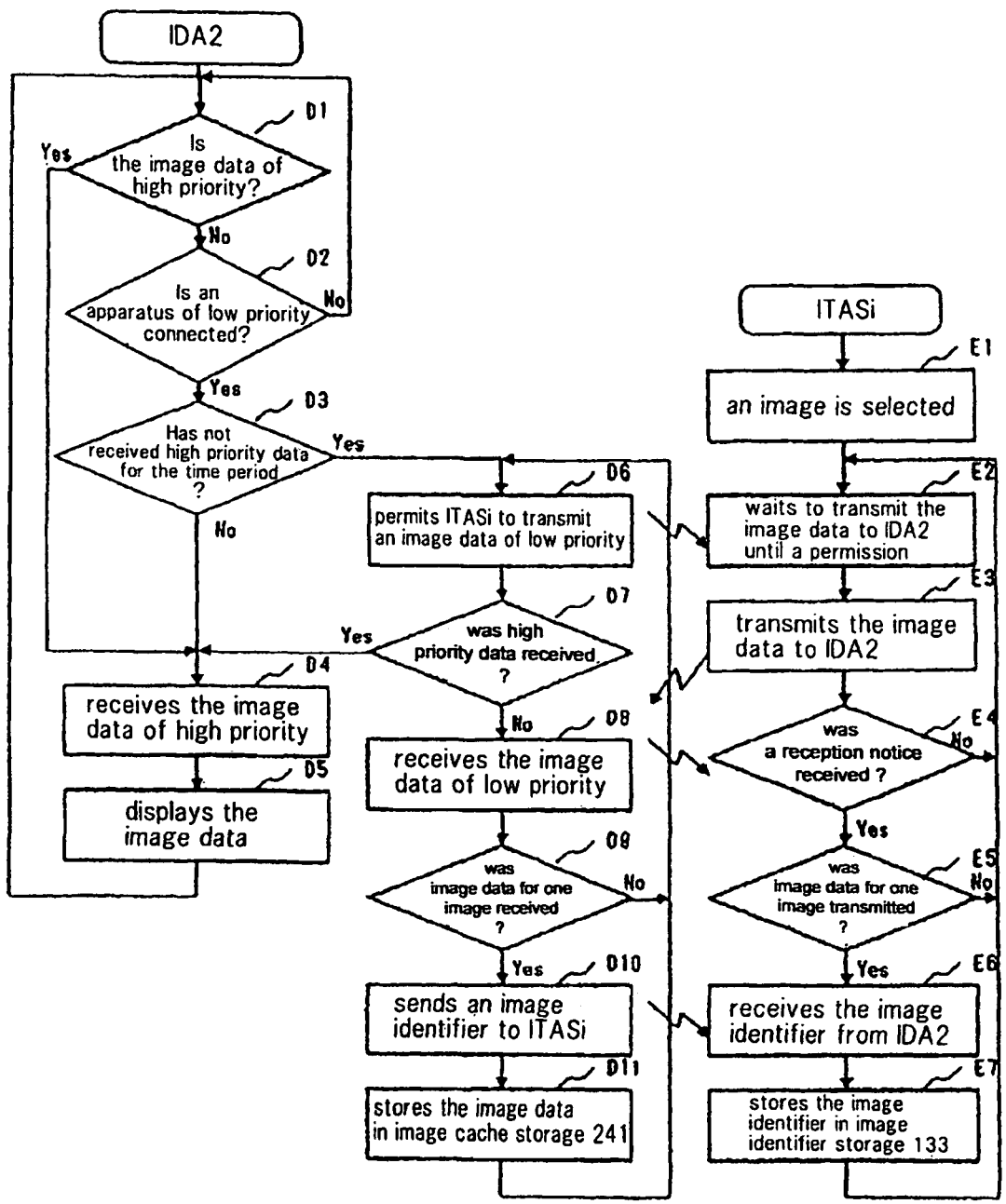
FIG. 6 is a flowchart illustrating the operational procedure for an image transmitting apparatus that does not have display authority to transmit image data little by little in advance to the image display apparatus.

FIG. 6 is a flowchart illustrating the operational procedure for an image transmitting apparatus that does not have the display authority to transmit image data little by little in advance to an image display apparatus.

Image display unit 121 displays images stored in image data storage 132, and image selector 122 has the user select an image for transmission to image display apparatus 2 via user operation input unit 111. Image selector 122 notifies image transmitter 143 of the image selected by the user (step E1). Here, the user may be allowed to select more than one image for transmission to image display apparatus 2. Image transmitter 143 stores the selected image, and waits until image transmitting apparatus SI is permitted to transmit image data by image display apparatus 2 (step E2).

Image receiver 223 of image display apparatus 2 waits for reception of image data having high priority from image transmitting apparatus S1 which has the display authority for image display apparatus 2. If image receiver 223 recognizes that image display apparatus 2 is connected to an image transmitting apparatus Si having low priority (step D2) and determines that high priority data has not been received for a predetermined time period or longer (step D3), image receiver 223 notifies image transmission requester 222 that it may start reception of low priority image data from image transmitting apparatus Si that does not have the display authority.

Image transmission requester 222 transmits a transmission enabling signal indicating that transmission of image data is permitted to image transmitting apparatus Si, which does not have display authority, via data transmitter 221 (step D6). When a number of image transmitting apparatuses are waiting for that its image is displayed, image transmission requester 222 transmits the transmission enabling signal to one of them. Here, image transmission requester 222 may transmit the transmission enabling signal in the order in which the apparatuses have sent a connection request signal.

Upon receipt of the transmission enabling signal for image data from image display apparatus 2 via data receiver 152, image transmitter 143 of image transmitting apparatus Si transmits image data selected by the user in advance to image display apparatus 2 via data transmitter 151 in accordance with an image transmission condition having low priority assigned by image display apparatus 2 (step E3). Image transmitter 143 determines whether a reception completion notice has been received or not from image display apparatus 2 (step E4). If image transmitter 143 determines that transmission of image data for one image is not completed (step E5), it again waits for permission to transmit image data.

If image receiver 223 of image display apparatus 2 determines that image data having high priority has not been received from image transmitting apparatus S1 which has the display authority for image display apparatus 2 after sending a transmission enabling signal for image data to image transmitting apparatus Si that does not have display authority (step D7), image receiver 223 receives image data of low priority from image transmitting apparatus Si, which does not have display authority, via data receiver 212 (step D8).

Furthermore, if image receiver 223 determines that reception of image data for one image is not completed (step D9), image receiver 223 proceeds to send a transmission enabling signal for the next image data to image transmitting apparatus Si via image transmission requester 222 and data transmitter 221 (step D6).

In this manner, image receiver 223 continues to receive low priority image data from image transmitting apparatus Si which does not have the display authority when high priority image data from image transmitting apparatus S1, which has the display authority, is not being received.

Then, when image receiver 223 determines that image data for one image has been received from image transmitting apparatus Si (step D9), image receiver 223 obtains an image identifier that can uniquely identify the received image data from image identifier generator 225, and sends a notice that the one image has been received and sends the image identifier to image transmitting apparatus Si via data transmitter 211 (step D10).

Image receiver 223 further passes the image data and image identifier to image cache creator 232. Image cache creator 232 stores the image data in image cache storage 241 with the image identifier as a cache key (step D11).

When image transmitter 143 of image transmitting apparatus Si determines that transmission of one image is completed (step E5), image transmitter 143 receives the notice that one image has been received and receives the image identifier from image display apparatus 2 via data receiver 152 (step E6), and stores the image identifier in image identifier storage 133 as a key for identifying the successfully transmitted image (step E7).

On the other hand, if image receiver 223 of image display apparatus 2 determines at step D7 that high priority image data has been received from image transmitting apparatus S1 that has the display authority, image receiver 223 will not receive image data from image transmitting apparatus Si which has low priority and will receive high priority image data transmitted from image transmitting apparatus S1 which has the display authority.

At this point, since image transmitter 143 of image transmitting apparatus Si cannot receive a notice of reception completion for image data transmission, image transmitter 143 determines that transmission having low priority image data has timed out (step E4), and waits until image transmitting apparatus Si is again permitted to transmit image data by image display apparatus 2 (step E2).

As stated above, image transmitter 143 of image transmitting apparatus Si having low priority repeats the process of transmitting image data to image display apparatus 2 little by little in advance and of storing an image identifier that corresponds to a successfully transmitted image in image identifier storage 133 while image transmitting apparatus S1 that has the display authority is not transmitting image data to image display apparatus 2.

In this way, a network can be effectively utilized by transmitting image data having low priority little by little from an image transmitting apparatus to an image display apparatus during a time period in which transmission of high priority image data is not performed.

Thereafter, when image transmitting apparatus Si having low priority has already transmitted image data for several images to image display apparatus 2, image display apparatus 2 receives a signal advising that image transmitting apparatus S1 that now has the display authority will revoke the display authority for image display apparatus 2. Upon receipt of the signal, device connection manager 221 of image display apparatus 2 broadcasts a display availability notifying signal to all image transmitting apparatuses Si that are connected to image display apparatus 2, except image transmitting apparatus S1, via data transmitter 211, in order to inform them that image transmitting apparatus S1 no longer has the display authority for image display apparatus 2 and image display apparatus 2 is ready for image display processing.

Upon receipt of the display availability notifying signal from image display apparatus 2 via data receiver 152, connection state manager 141 of image transmitting apparatus Si recognizes that image transmitting apparatus S1 now does not have the display authority to make image display apparatus 2 display images, and writes it into video memory 131 to indicate on the screen that it is possible to gain the display authority for image display apparatus 2.

If acquisition of the display authority for image display apparatus 2 is requested via user operation input unit 111, connection state manager 141 transmits an authority request signal for requesting the authority to display an image on image display apparatus 2 to image display apparatus 2 via data transmitter 151.

When device connection manager 221 of image display apparatus 2 receives the authority request signal for obtaining the display authority for image display apparatus 2 from image transmitting apparatus Si via data receiver 212, if any other image transmitting apparatus Sj (j being an arbitrary integer between 2 and n, where j≠i) does not have the display authority for image display apparatus 2, device connection manager 221 decides to permit image transmitting apparatus Si to have the display authority for image display apparatus 2.

Then, when device connection manager 221 obtains a high priority image transmission condition which has display authority from image transmission condition determiner 226, device connection manager 221 transmits to image transmitting apparatus Si via data transmitter 211 an authorization completion notice that contains information that the display authority is granted and that image data may be transmitted at any time, as well as information that an image transmission condition of high priority is permitted. Device connection manager 221 further stores the connected device identifier of image transmitting apparatus Si which has obtained the display authority in connected device identifier storage 243.

Upon receipt of the authorization completion notice containing information that the display authority is granted and that image data may be transmitted at any time as well as the information that an image transmission condition having high priority is permitted from image display apparatus 2 via data receiver 152, connection state manager 141 of image transmitting apparatus Si subsequently operates in a similar manner to when image transmitting apparatus S1 that has the display authority transmits image data as described above.

Image transmitting apparatus Si may also transmit an authority request signal to obtain the display authority to image display apparatus 2 whenever connection state manager 141 receives information that no other image transmitting apparatus has the display authority even if there is no input from user operation input unit 111.

Next, the operation after image transmitting apparatus Si transitions from a state in which it does not have the display authority for image display apparatus 2 to a state in which it has the display authority will be described.

Figure 7:
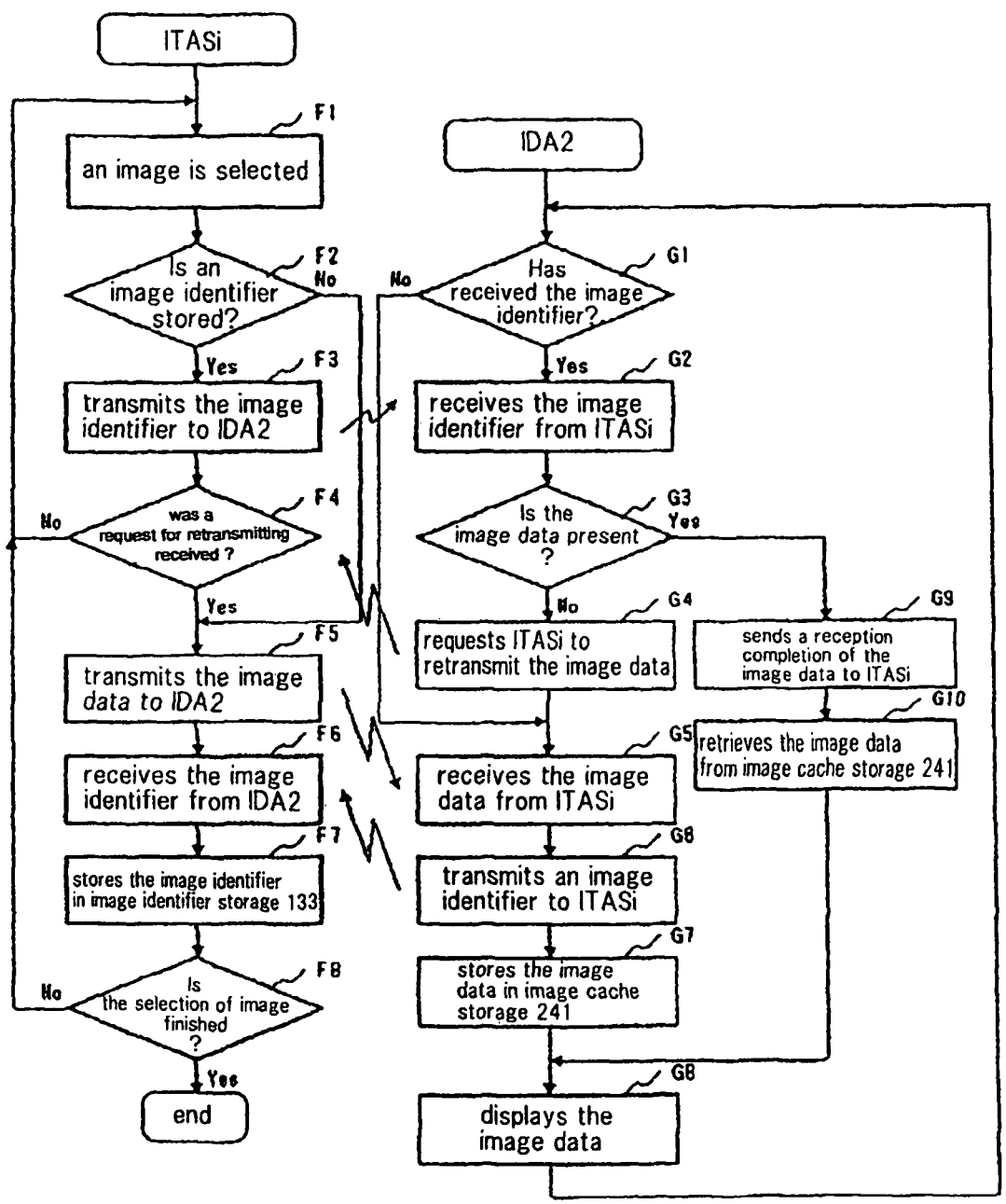
FIG. 7 is a flowchart illustrating the operational procedure after the image transmitting apparatus transitions from a state in which it does not have the display authority for the image display apparatus to a state it has the display authority.

FIG. 7 is a flowchart illustrating the operational procedure after an image transmitting apparatus transitions from a state in which it does not have the display authority for the image display apparatus to a state in which it has the display authority.

Image display unit 121 of image transmitting apparatus Si displays images stored in image data storage 132, and image selector 122 has the user select an image for display on image display apparatus 2 via user operation input unit 111. Image selector 122 notifies image transmitter 143 of the image selected by the user (step F1).

Image transmitter 143 checks whether an image identifier that can uniquely identify the selected image data is stored in image identifier storage 133. If image transmitter 143 determines that the image identifier is already stored (step F2), image transmitter 143 transmits the image identifier to image display apparatus 2 via data transmitter 151 instead of image data (step F3).

On the other hand, if image transmitter 143 determines at step F2 that an image identifier that can uniquely identify the selected image data is not stored in image identifier storage 133, image transmitter 143 transmits the image data to image display apparatus 2 via data transmitter 151 (step F5).

Upon determining that an image identifier has been received from image transmitting apparatus Si via data receiver 212 (step G1), image receiver 223 of image display apparatus 2 passes the image identifier to image cache searcher 231 (step G2).

Image cache searcher 231 searches for image data corresponding to the image identifier in image cache data storage 241, and if image cache searcher 231 determines that image data is present (step G3), image cache searcher 231 notifies image receiver 223 of the discovery of the image data. Image receiver 223 notifies image transmitting apparatus Si via data transmitter 211 that image acquisition by means of the image identifier was successfully completed (step G9).

Furthermore, image cache searcher 231 retrieves the image data from image cache storage 241, and passes it to image display unit 233 (step G10). Image display unit 233 writes the image data into video memory 242 to display it on the screen (step G8).

On the other hand, if image cache searcher 231 determines at step G3 that there is no image data corresponding to the image identifier in image cache data storage 241, image cache searcher 231 notifies image receiver 223 that image data could not be found. Image receiver 223 requests image transmitting apparatus Si via data transmitter 211 to retransmit the image data because image acquisition could not be completed with the image identifier (step G4).

Upon being notified by image display apparatus 2 via data receiver 152 that image acquisition could be completed (i.e., a request for image data retransmission was not received) as a response to the image identifier transmission, image transmitter 143 of image transmitting apparatus Si determines that image display is completed (step F4), and returns to image selection processing at step F1.

On the other hand, if image transmitter 143 receives a request for retransmitting image data from image display apparatus 2, image transmitter 143 determines that the image by transmission of the image identifier could not be displayed on image display apparatus 2 (step F4), and deletes the image identifier of the image data that could not be displayed from image identifier storage 133, and transmits the image data to image display apparatus 2 (step F5).

If image receiver 223 determines that an image identifier has not been received from image transmitting apparatus Si via data receiver 212 (step G1), image receiver 223 of image display apparatus 2 receives image data from image transmitting apparatus Si (step G5).

Depending on limitation on the capacity of storage 24 of image display apparatus 2 or the amount of image data transmitted from other image transmitting apparatuses, not all of the image data transmitted in advance from image transmitting apparatus Si that does not have display authority (i.e., the image data for which image transmitting apparatus Si could receive an image identifier) may be stored on image display apparatus 2. For this reason, image transmitting apparatus Si is provided with means for requesting retransmission of image data as stated above.

Furthermore, upon receipt of image data from image transmitting apparatus Si via data receiver 212 (step G5), image receiver 223 of image display apparatus 2 acquires an image identifier that can uniquely identify the received image data from image identifier generator 225, and transmits a notice of image acquisition completion and the image identifier to image transmitting apparatus SI via data transmitter 211 (step G6), and also passes the image data and image identifier to image cache creator 232.

Image cache creator 232 stores the image data in image cache storage 241 and stores the image identifier as a cache key in image cache storage (step G7), and passes the image data to image display unit 233. Image display unit 233 writes the image data into video memory 242 to display it on the screen (step G8).

When image transmitter 143 of image transmitting apparatus Si receives the notice of image acquisition completion and the new image identifier via data receiver 152 (step F6), image transmitter 143 stores the new image identifier in image identifier storage 133 as a key for uniquely identifying the image that was successfully transmitted (step F7). If the user subsequently performs an operation for displaying the image on image display apparatus 2 (step F8), the process returns to image selection by the user (step F1).

In this manner, image transmitting apparatus Si having the display authority can speedily have the image display apparatus display image data just by transmitting an image identifier when image transmitting apparatus Si wants to display image data transmitted in advance when image transmitting apparatus Si does not have the display authority.

In addition, when image transmitting apparatus Si having the display authority transmits several image data to image display apparatus 2 to display them and later wants to display the same images on image display apparatus 2 again, image transmitting apparatus Si can speedily have image display apparatus 2 display the image data by transmitting only an image identifier.

As described above, the image display apparatus of the present exemplary embodiment grants the display authority to one of a number of image transmitting apparatuses, and preferentially displays image data received from that image transmitting apparatus. Other image transmitting apparatuses cannot transmit image data to the image display apparatus unless they are permitted to do so by the image display apparatus. This can prevent congestion of a network band with image data from image transmitting apparatuses that have no display authority.

In addition, since the load on the image display apparatus is light while it is not receiving image data for preferential display, image data can be collected from an image transmitting apparatus that does not have display authority by permitting transmission from the image display apparatus to another image transmitting apparatus that does not have display authority by taking into consideration the load condition of the image display apparatus. Consequently, an image display apparatus on a network can be shared by a number of image transmitting apparatuses, and an image transmitting apparatus that does not have any display authority can also transmit image data to the image display apparatus without hindering image data transmission from an image transmitting apparatus that has the display authority.

In addition, when the image display apparatus receives image data from an image transmitting apparatus that does not have display authority, the image display apparatus creates an image identifier corresponding to the received image data, stores the image identifier and the received image data in association with each other, and sends back the image identifier to the originating image transmitting apparatus. Thereafter, when the image transmitting apparatus that does not have display authority obtains the display authority and the image display apparatus receives the image identifier from the image transmitting apparatus, the image display apparatus displays an image that is stored with an image identifier that corresponds to the image identifier received. This can shorten the time required for image display, including the time for transmitting image data.

While the above-described exemplary embodiment illustrated that one image transmitting apparatus has the display authority and that image transmitting apparatuses of (n−1) units do not have the display authority, it is also possible to adopt a configuration that grants the display authority to image transmitting apparatuses of 'm (m being an integer less than n)' units and not to image transmitting apparatuses of (n−m) units, e.g., when a sufficient network band is available. In this configuration, the image display apparatus can allocate different image data transmissions to image transmitting apparatuses depending on whether they have the display authority or not so that it can preferentially receive image data from image transmitting apparatuses of m units that have the display authority.

In addition, although the above-described exemplary embodiment provides a user interface for the user to select image data on the image transmitting apparatuses and has the user select image data for transmission, image data for transmission may also be an image that automatically changes without a user's operation, such as a screen of a personal computer that operates in accordance with a predetermined procedure or a camera image taken by a monitoring camera.

In addition, the method of processing image data of the present invention can be applied to a usage for displaying an image displayed on the screen of a computer and the like on an image display apparatus such as a projector over a wired or wireless network. Furthermore, the method of processing image data of the present invention is also applicable to a usage for realizing a remote control function among a number of computers that are connected via a network.

While the invention has been particularly shown and described with reference to the exemplary embodiment thereof, the invention is not limited to the embodiment. It will be understood by those of ordinary skill in the art that various changes in form and details may be made therein without departing from the spirit and scope of the present invention as defined by the claims.

The invention claimed is:

1. An apparatus for displaying an image, said apparatus comprising:
    a connected device controller:
        for notifying a first apparatus for transmitting an image, the first apparatus being one of a plurality of apparatuses for transmitting an image connected via a network, the first apparatus having made a first connection request after activation, that the first apparatus is granted a display authority, which includes a right to have processing for displaying the image preferentially performed and to transmit image data at any time; and
        for notifying a second apparatus for transmitting an image, the second apparatus being another one or more of said plurality of apparatuses connected via said network for transmitting the image and that have made a connection request, of information that the image data cannot be transmitted unless permitted;

a storage in which can be stored a connected device identifier for identifying an apparatus for transmitting the image and that has said display authority; and an image processor for displaying received image data when a sender of the image data which is received from outside via said network is said first apparatus for transmitting an image, and for storing the received image data in said storage when the sender of the received image data is said second apparatus for transmitting an image, wherein, when granting said display authority to said first apparatus for transmitting an image, said connected device controller stores said connected device identifier of said first apparatus for transmitting the image in said storage, and upon receipt of the image data from outside via said network, makes reference to said connected device identifier stored in said storage and determines whether the sender of the received image data is said first apparatus for transmitting an image, wherein said connected device controller notifies said first apparatus for transmitting the image and that has said display authority, of information that a predetermined image transmission condition is permitted, and notifies said second apparatus for transmitting the image and that does not have said display authority, of information that an image transmission condition that has a lower priority than said predetermined image transmission condition is permitted, and wherein the image transmission condition that has the lower priority comprises at least one of a data transmission unit smaller than a predetermined unit, a data transmission frame size smaller than a predetermined frame size, a time-out period longer than a predetermined time period, and no re-transmission upon a transmission failure.

2. The apparatus according to claim 1, wherein said connected device controller sends information indicating that transmission of the image data is permitted to one of said second apparatuses for transmitting the image if there is no reception of the image data from said first apparatus for transmitting the image for the predetermined time period or longer, and upon receipt of the image data from said second apparatus for transmitting an image, generates an image identifier for identifying the received image data and sends back said image identifier to said second apparatus for transmitting man image, and wherein said image processor stores said image identifier in said storage together with the image data received from said second apparatus for transmitting an image.

3. The apparatus according to claim 2, wherein said connected device controller notifies a plurality of said second apparatuses for transmitting an image, of information that processing for displaying the image is available, upon receipt from said first apparatus for transmitting the image of a notice requesting that said display authority be revoked or a request to disconnect a line, and notifies one of said second apparatuses for transmitting the image and that has later made a request for said display authority, of information that said display authority is granted and that the image data may be transmitted at any time, and wherein said image processor, upon receipt of said image identifier from said second apparatus for transmitting the image and that has said display authority, retrieves said image data identified by said image identifier from said storage and displays the image data.

4. An apparatus for displaying an image, said apparatus comprising:

a communication unit for communicatively connecting with a plurality of apparatuses for transmitting an image via a network;

a unit for notifying one of said plurality of apparatuses for transmitting the image connected via a network and that has made a first connection request after activation, of information that a display authority, which includes a right to preferentially perform processing for displaying the image and to transmit image data at any time, and for notifying another one or more of said plurality of apparatuses for transmitting the image and that have made a connection request, of information that the image data cannot be transmitted unless permitted;

a storage in which a connected device identifier for identifying an apparatus for transmitting the image and that has said display authority can be stored; and an image processor for displaying received the image data when a sender of the image data which is received from outside via said network is said one of said plurality of apparatuses for transmitting an image, and for storing the received image data in said storage when the sender of the received image data is said another one or more of said plurality of apparatuses for transmitting an image, wherein said unit for notifying notifies said one of said plurality of apparatuses for transmitting the image and that has said display authority, of information that a predetermined image transmission condition is permitted, and notifies said another one or more of said plurality of apparatuses for transmitting the image and that does not have said display authority, of information that an image transmission condition that has a lower priority than said predetermined image transmission condition is permitted, and wherein the image transmission condition that has the lower priority comprises at least one of a data transmission unit smaller than a predetermined unit, a data transmission frame size smaller than a predetermined frame size, a time-out period longer than a predetermined time period, and no re-transmission upon a transmission failure.

5. A system for processing image data, said system comprising:

a plurality of apparatuses interconnected by a network, each apparatus potentially transmitting an image; and an apparatus for receiving and selectively displaying an image transmitted on said network, said apparatus including a connected device controller for notifying one of said plurality of apparatuses for transmitting the image connected via a network and that has made a first connection request after activation, of a display authority, which includes a right to preferentially have processing performed for displaying the image and to transmit the image data at any time under said display authority, and for notifying another one or more of said plurality of apparatuses for transmitting the image and that have made a connection request, of information that the image data cannot be transmitted unless permitted under said display authority;

a storage in which a connected device identifier for identifying an apparatus for transmitting the image and that has said display authority can be stored; and an image processor for displaying received image data when a sender of the image data which is received from outside via said network is said one of said plurality of apparatuses for transmitting an image, and for storing the received image data in said storage when the sender of the received image data is said another one or more of said plurality of apparatuses for transmitting an image, wherein said connected device controller notifies said one of said plurality of apparatuses for transmitting the image and that has said display authority, of information that a predetermined image transmission condition is permitted, and notifies said another one or more of said plurality of apparatuses for transmitting the image and that does not have said display authority, of information that an image transmission condition that has a lower priority than said predetermined image transmission condition is permitted, and wherein the image transmission condition that has the lower priority comprises at least one of a data transmission unit smaller than a predetermined unit, a data transmission frame size smaller than a predetermined frame size, a time-out period longer than a predetermined time period, and no re-transmission upon a transmission failure.

6. A method of processing image data by an apparatus for displaying an image, said method comprising:

notifying a first apparatus for transmitting an image and that is one of a plurality of apparatuses for potentially transmitting the image connected via a network, said first apparatus having made a first connection request after activation, of information that a display authority has been granted, said display authority including a right to have preferentially performed a processing for displaying the image and to transmit the image data at any time under said display authority;

notifying a second apparatus for transmitting the image and that is another one or more of said plurality of apparatuses on said network for potentially transmitting the image and that have made a connection request, of information that the image data cannot be transmitted unless permitted under said display authority;

storing a connected device identifier of said first apparatus for transmitting the image when granting said display authority to said first apparatus for transmitting an image, upon receipt of the image data from outside via said network, making reference to said connected device identifier stored and determining whether a sender of the received image data is said first apparatus for transmitting an image;

displaying the received image data if the sender of the received image data is said first apparatus for transmitting an image, and storing the received image data if the sender of the received image data is said second apparatus for transmitting an image;

notifying said first apparatus for transmitting the image and that has said display authority, of information that a predetermined image transmission condition is permitted; and notifying said second apparatus for transmitting the image and that does not have said display authority, of information that an image transmission condition that has a lower priority than said predetermined image transmission condition is permitted, wherein the image transmission condition that has the lower priority comprises at least one of a data transmission unit smaller than a predetermined unit, a data transmission frame size smaller than a predetermined frame size, a time-out period longer than a predetermined time period, and no re-transmission upon a transmission failure.

7. The method according to claim 6, further comprising:

sending information indicating that transmission of the image data is permitted to one of said second apparatuses for transmitting the image if there is no reception of the image data from said first apparatus for transmitting the image for the predetermined time period or longer;

upon receipt of the image data from said second apparatus for transmitting an image, generating an image identifier for identifying received the image data; and sending back said image identifier to said second apparatus for transmitting the image and storing said image identifier together with the image data received from said second apparatus for transmitting an image.

8. The method according to claim 7, further comprising:

notifying a plurality of said second apparatus for transmitting an image, of information that processing for displaying the image is available, upon receiving from said first apparatus for transmitting the image a notice requesting that said display authority be revoked or a request to disconnect a line;

notifying one of said second apparatuses for transmitting the image and that has later made a request for said display authority, of information that said display authority is granted and that the image data may be transmitted at any time; and upon receipt of said image identifier from said second apparatus for transmitting the image and that has said display authority, retrieving the image data identified by said image identifier and displaying the image data.

9. The apparatus according to claim 1, wherein said second apparatus lacks the display authority.

10. The apparatus according to claim 1, wherein the image processor receives a result of determining whether a connected device identifier of an image transmitting apparatus which is the sender of the image data is stored in said connected device identifier of said storage from said connected device controller.

11. The apparatus according to claim 10, further comprising an image cache generator; and image cache data storage, wherein if the connected device identifier of the image transmitting apparatus is not stored in said connected device identifier of said storage, the image cache generator stores the image data and an image identifier as a pair in said image cache data storage.

12. The apparatus according to claim 10, wherein, if the connected device identifier of the image transmitting apparatus is stored in said connected device identifier of said storage, the image processor displays the image data.

13. The apparatus according to claim 4, wherein said unit for notifying said one of said plurality of apparatuses stores said connected device identifier of said one of said plurality of apparatuses for transmitting the image in said storage when granting said display authority to said one of said plurality of apparatuses for transmitting an image, and upon receipt of the image data from outside via said network, makes reference to said connected device identifier stored in said storage and determines whether the sender of the received image data is said one of said plurality of apparatuses for transmitting an image.

14. The system according to claim 5, wherein said connected device controller stores said connected device identifier of said first apparatus for transmitting the image in said storage when granting said display authority to said one of said plurality of apparatuses for transmitting an image, and upon receipt of the image data from outside via said network, makes reference to said connected device identifier stored in said storage and determines whether the sender of the received image data is said one of said plurality of apparatuses for transmitting an image.

15. The apparatus according to claim 1, wherein said second apparatus for transmitting the image, having no display authority, transmits the image data depending on a load condition of the apparatus for displaying the image.

16. The apparatus according to claim 1, wherein the image transmission condition that has the lower priority comprises the data transmission frame size smaller than the predetermined frame size.

17. The apparatus according to claim 16, wherein the image transmission condition that has the lower priority further comprises the time-out period longer than the predetermined time period.

18. The apparatus according to claim 1, wherein the image transmission condition that has the lower priority comprises the time-out period longer than the predetermined time period.

* * * * *